United States Patent
Oduro

(10) Patent No.: US 12,122,957 B2
(45) Date of Patent: Oct. 22, 2024

(54) POLYMERIC RED MUD-BASED KILLING FLUID AND USES THEREOF

(71) Applicant: SAUDI ARABIAN OIL COMPANY, Dhahran (SA)

(72) Inventor: Harry Daniel Oduro, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/065,408

(22) Filed: Dec. 13, 2022

(65) Prior Publication Data

US 2024/0191126 A1 Jun. 13, 2024

(51) Int. Cl.
*C09K 8/48* (2006.01)

(52) U.S. Cl.
CPC .......... *C09K 8/48* (2013.01); *C09K 2208/20* (2013.01)

(58) Field of Classification Search
CPC . C09K 8/48; C09K 8/467; C09K 8/46; C09K 8/426; C09K 8/42; C09K 2208/20
See application file for complete search history.

(56) References Cited

U.S. PATENT DOCUMENTS

| 3,301,323 | A | * | 1/1967 | Parsons | C09K 8/54 175/38 |
| 5,053,144 | A | | 10/1991 | Szirmai et al. | |
| 6,248,302 | B1 | | 6/2001 | Barnett et al. | |
| 10,087,359 | B2 | | 10/2018 | Pisklak et al. | |
| 10,633,940 | B2 | * | 4/2020 | Pisklak | C09K 8/502 |
| 10,975,284 | B2 | | 4/2021 | Cheng et al. | |
| 11,326,439 | B2 | | 5/2022 | Oduro | |
| 2011/0061872 | A1 | * | 3/2011 | Mix | E21B 21/082 175/7 |
| 2015/0315875 | A1 | * | 11/2015 | Chatterji | C04B 28/02 166/305.1 |
| 2017/0174982 | A1 | * | 6/2017 | Gamage | C09K 8/12 |

(Continued)

FOREIGN PATENT DOCUMENTS

| CN | 101445720 A | 6/2009 | |
| CN | 109530392 A | * 3/2019 | ............... B09B 3/00 |

(Continued)

OTHER PUBLICATIONS

Translation of JP 5725382 A (Year: 1982).*

(Continued)

*Primary Examiner* — Angela M DiTrani Leff
(74) *Attorney, Agent, or Firm* — Osha Bergman Watanabe & Burton LLP

(57) ABSTRACT

A high-density red mud-based kill fluid composition includes a neutralized red mud slurry, a polymeric material, and an $H_2S$ capturing agent. A method of neutralizing red mud includes providing a red mud slurry, adding gypsum to the red mud slurry, and providing a neutralized red mud slurry, wherein the neutralized red mud slurry has a pH ranging from 7.5 to 9.0. A method of treating a sour well includes injecting a red mud-based kill fluid including a neutralized red mud slurry, a polymeric material, and an $H_2S$ capturing agent into the sour well, wherein the sour well comprises $H_2S$ gas and $CO_2$ gas, solidifying the red mud-based kill fluid, and treating the $H_2S$ gas and the $CO_2$ gas in the sour well.

11 Claims, 7 Drawing Sheets

(56) References Cited

U.S. PATENT DOCUMENTS

| | | | |
|---|---|---|---|
| 2017/0306211 A1 | 10/2017 | Pisklak et al. | |
| 2022/0073808 A1 | 3/2022 | Oduro | |
| 2022/0268489 A1* | 8/2022 | Schmidt | E21B 43/267 |

FOREIGN PATENT DOCUMENTS

| | | | | |
|---|---|---|---|---|
| CN | 111808582 A | * | 10/2020 | |
| CN | 113511843 A | | 10/2021 | |
| CN | 114058420 A | | 2/2022 | |
| JP | 5725382 A | * | 2/1982 | C09K 17/00 |
| TH | 74695 B | | 2/2020 | |
| WO | 2005/077830 A1 | | 8/2005 | |
| WO | 2007082505 A9 | | 10/2007 | |
| WO | 2015058239 A1 | | 4/2015 | |
| WO | 2016/122530 A1 | | 8/2016 | |

OTHER PUBLICATIONS

Translation of CN-109530392-A (Year: 2019).*
Translation of CN-111808582-A (Year: 2020).*
Karpov et al. "Well Control and Management: Killing Fluids for Oil Fields of JSOC Bashneft" SPE-171308-MS. (2014) (18 pages).
Mahmood Amani and Mohamed Almodaris. "Safe Practices in Drilling and Completion of Sour Gas Wells" J Pet Environ Biotechnol, 7:4. (2016) (8 pages).
Bellarby J. "Well completion design" pp. 419-450. (2009) (32 pages).
Fang et al. "A study of new low-cost anti-scaling compound salt high-density solid free killing fluid" IOP Conf. Ser.: Mater. Sci. Eng. 490 (2019) (8 pages).
Éva et al.,"Re-using bauxite residues: benefits beyond (critical raw) material recovery" Chem Technol Biotechnol. 93: 2498-2510 (2018) (13 pages).
Xiowei Cheng et al., "Utilization of red mud, slag and waste drilling fluid for the synthesis of slag-red mud cementitious material" Journal of Cleaner Production <https://www.sciencedirect.com/journal/journal-of-cleaner-production>. 238, 117902. (2019) (21 pages).
Suchita Rai "Neutralization and utilization of red mud for its better waste management" Arch. Environ. Sci. (2012), 6, 13-33 (21 pages).
Qaidi, Shaker MA, et al. "Sustainable utilization of red mud waste (bauxite residue) and slag for the production of geopolymer composites: a review." Case Studies in Construction Materials (2022): e00994. (29 pages).
International Search Report and Written Opinion of the International Searching Authority issued in corresponding International Application No. PCT/US2023/083394, mailed Apr. 3, 2024 (18 pages).
Lyu, Fei et al., "Dealkalization processes of bauxite residue: A comprehensive review"; Journal of Hazardous Materials; vol. 403, Article 123671; pp. 1-17; Feb. 5, 2021 (17 pages).
Sahu, Ramesh Chandra et al., "Removal of hydrogen sulfide using red mud at ambient conditions"; Fuel Processing Technology; vol. 92, Issue 8; pp. 1587-1592; Aug. 2011 (6 pages).

* cited by examiner

POLYMERIC RED MUD-BASED KILLING FLUID AND USES THEREOF

BACKGROUND

Recent environmental restrictions to cut down highly toxic and harmful $H_2S$ and $CO_2$ emissions in isolated sour petroleum reservoirs have led to the advent of various green fluids, emulsifiers, chemical surfactant, and geo-polymer technologies intended for use in mud formulations for hydrocarbon well kill operations. Typically, well kill operations use high-density, water-based mud fluids and additives to prevent unexpected blowout of abandoned and depleted wells. In sour wells, the goal is to formulate a high-density kill fluid that can ensure safety of well completion operations by preventing any entry of formation fluids or emission of large quantities of climatically active $CO_2$ and $H_2S$ greenhouse gas into the environment.

Unfortunately, the large amount of free water in conventional high-density water-based kill fluids can increase the $H_2S$ content in a sulfur-bearing reservoir or easily cause water blocking damage to the reservoir. Therefore, there exists a need to develop a high-density kill fluid formulation with little to no water that can be used in high temperature-high pressure (HTHP) sour reservoirs.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a high-density red mud-based kill fluid composition including a neutralized red mud slurry, a polymeric material, and an $H_2S$ capturing agent.

In another aspect, embodiments disclosed herein relate to a method of neutralizing red mud that includes providing a red mud slurry, adding gypsum to the red mud slurry, and providing a neutralized red mud slurry, wherein the neutralized red mud slurry has a pH ranging from 7.5 to 9.0.

In yet another aspect, embodiments disclosed herein relate to a method of treating a sour well that includes injecting a red mud-based kill fluid including a neutralized red mud slurry, a polymeric material, and an $H_2S$ capturing agent into the sour well, wherein the sour well comprises $H_2S$ gas and $CO_2$ gas, solidifying the red mud-based kill fluid, and treating the $H_2S$ gas and the $CO_2$ gas in the sour well.

Other aspects and advantages of the claimed subject matter will be apparent from the following description and the appended claims.

DETAILED DESCRIPTION

The present disclosure generally relates to compositions and methods for well kill operations. In particular, disclosed compositions and methods may be used in well kill operations of a sour well. A sour well may be any well that produces or is capable of producing sour gas. As will be appreciated by one of ordinary skill in the art, the term "sour gas" may be used to describe gas that has been contaminated with sulfur or sulfur compounds, particularly with hydrogen sulfide ($H_2S$). Sour gas may also include other corrosion-inducing gases, such as, for example, $CO_2$. Thus, compositions and methods disclosed herein that are used in well kill operations may also treat sour gas.

Compositions in accordance with the present disclosure may include a red mud-based kill fluid. The red mud-based kill fluid may include a neutralized red mud slurry, a polymeric material, and an $H_2S$ capturing agent. A method of preparing the neutralized red mud slurry is disclosed herein. Compositions of one or more embodiments may be used to treat sour gas within a sour well and to kill the sour well. In some embodiments, compositions and methods disclosed herein may enable the concurrent treatment and killing of sour wells.

Method of Neutralizing Red Mud

In one aspect, embodiments of the present disclosure relate to a method for waste red mud neutralization. Red mud, also known as waste bauxite residue and bauxite tailings, is a highly caustic waste product of the Bayer process, in which alumina is extracted from bauxite ore. The Bayer process is responsible for over 95% of all alumina produced worldwide, and for every ton of alumina produced via the Bayer process, approximately 1 to 1.5 tons of red mud is produced. Red mud generated during the extraction of alumina from bauxite ore is characterized by high pH (typically between pH 11-14) and high concentrations of soluble ions, with little to no organic matter. Due to its high alkalinity, red mud has been deemed environmentally toxic, however, the present disclosure describes methods and compositions that use waste red mud to remedy environmental problems encountered in the oil and gas industry.

In such compositions and methods, the red mud may be neutralized such that it is no longer caustic to the environment. Thus, one or more embodiments disclose a method of neutralizing red mud. The method may include mixing waste red mud with gypsum to provide a neutralized red mud slurry. The neutralized red mud slurry may then be used in compositions and methods for well killing operations disclosed herein.

Typically, strong acids such as HCl, HNO$_3$, H$_2$SO$_4$, and CH$_3$COOH, are used to neutralize red mud on a small scale. However, for large scale industrial application in the petroleum field, strong acids cannot be used due to the high costs of buying large volumes of acidic reagents. Therefore, methods of neutralizing red mud in accordance with the present disclosure, notably, do not include strong acids.

Figure 1:
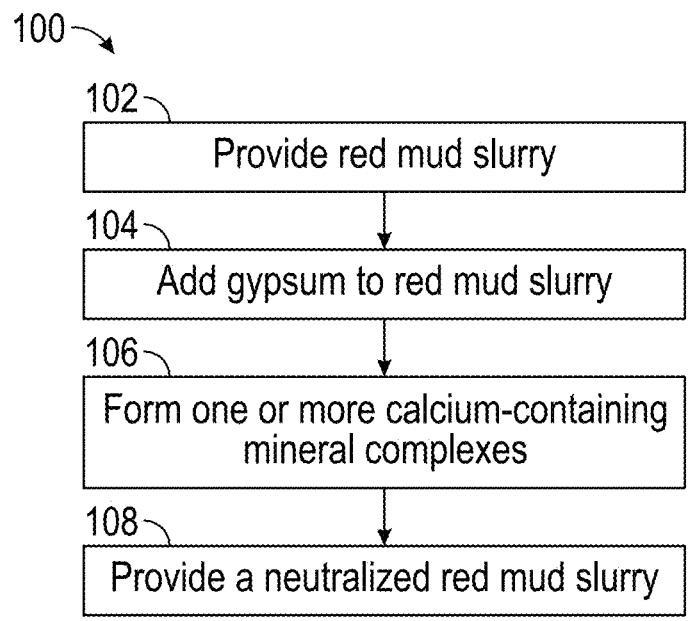
FIG. 1 is a block flow diagram of a method of neutralizing red mud in accordance with one or more embodiments of the present disclosure.

A method of neutralizing red mud is shown in, and discussed with reference to, FIG. 1. Initially, method 100 includes providing a red mud slurry 102. The red mud slurry may be collected from a dump site of any facility that produces alumina. In one or more embodiments, the red mud slurry includes an aqueous fluid and one or more minerals. The aqueous fluid includes water. The water may be distilled water, deionized water, tap water, fresh water from surface or subsurface sources, production water, formation water, synthetic sea water, black water, brown water, potable water, non-potable water, other waters, and combinations thereof, that are suitable for use in a wellbore environment. In one or more embodiments, the water used may naturally contain contaminants, such as salts, ions, minerals, organics, and combinations thereof, that do not interfere with the neutralization of the red mud slurry.

In one or more embodiments, the red mud slurry includes water in a range of from about 20 wt % to 40 wt % based on the total weight of the red mud slurry. In particular embodiments, the red mud slurry includes less than 40 wt % water based on the total weight of the red mud slurry.

As described above, the red mud slurry may include one or more minerals. Exemplary minerals that may be present in the waste red mud slurry include, but are not limited to, larnite (Ca$_2$(SiO$_4$)), cancrinite ((NaCa)$_8$(AlSiO$_4$)$_6$(CO$_3$SO$_4$)$_2$·2H$_2$O), hematite (Fe$_2$O$_3$), goethite (FeO(OH)), calcite (CaCO$_3$), perovskite (CaTiO$_3$), grossite (CaAl$_4$O$_7$), quartz (SiO$_2$), gibbsite (Al(OH)$_3$), and combinations thereof. The mineralogical composition of the red mud slurry may be determined by X-ray powder diffraction (XRD). In some embodiments, the elemental composition of the red mud slurry contains one or more elements that include, but are not limited to, Fe, Al, Na, Si, Ca, Ti, S, Zn, Sr, Mg, P, Cr, K, Mn, Ce, Pb, Ni, Th, and combinations thereof. The elemental composition of the red mud slurry may be determined by XRD.

In one or more embodiments, the red mud slurry includes one or more minerals in an amount ranging from 50 to 70 wt %, based on the total weight of the red mud slurry. For example, one or more minerals may be present in the red mud slurry in an amount ranging from a lower limit of one of 50, 52, 54, 56, 58, and 60 wt % to an upper limit of one of 60, 62, 64, 66, 68, and 70 wt %, where any lower limit may be paired with any mathematically compatible upper limit.

The red mud slurry may have a high alkalinity. As will be appreciated by one of ordinary skill in the art, alkalinity may be measured by pH, with a pH above 7.0 being considered alkaline or basic. In one or more embodiments, the red mud slurry may have a pH ranging from 11.0 to 14.0. For example, the pH of the red mud slurry may range from a lower limit of one of 11.0, 11.5, 12.0, and 12.5 to an upper limit of one of 12.5, 13.0, 13.5, and 14.0, where any lower limit may be paired with any mathematically compatible upper limit. In particular embodiments, the red mud slurry may have a pH ranging from 12.5 to 13.0.

Method 100 then includes adding gypsum to the provided red mud slurry 104. Gypsum, a soft mineral composed of calcium sulfate dihydrate (CaSO$_4$·2H$_2$O), is conventionally used as a fertilizer. However, in the present disclosure, gypsum may be used as a neutralizing agent for the highly alkaline red mud slurry.

In one or more embodiments, the gypsum is added to the red mud slurry as a gypsum solution. The gypsum solution may include gypsum and an aqueous fluid. The aqueous fluid includes water that may be as previously described with reference to the aqueous fluid of the red mud slurry. In one or more embodiments, the aqueous fluid of the gypsum solution is the same as the aqueous fluid of the red mud slurry.

The gypsum solution may include gypsum in a concentration ranging from 5.0 to 25 wt %, based on the total weight of the gypsum solution. For example, in one or more embodiments, the gypsum is present in the gypsum solution in a concentration ranging from a lower limit of one of 5.0, 10, and 15 wt % to an upper limit of one of 15, 20, and 25 wt %, where any lower limit may be paired with any mathematically compatible upper limit.

The gypsum may be added to the red mud slurry in an amount sufficient to neutralize the caustic minerals in the red mud slurry. A red mud slurry may be considered to be neutralized when it reaches a pH ranging from about 7.5 to 9.0. In one or more embodiments, the gypsum may be added to the red mud slurry in a mole ratio ranging from about 0.2:1 to about 0.4:1 gypsum to red mud slurry. For example, the gypsum may be added to the red mud slurry in an amount such that the mole ratio of the gypsum to the red mud slurry ranges from a lower limit of one of 0.2:1, 0.25:1, and 0.3:1 to an upper limit of one of 0.3:1, 0.35:1, and 0.4:1, where any lower limit may be paired with any mathematically compatible upper limit.

In one or more embodiments, the gypsum is added to the red mud slurry at ambient temperature and pressure. The reaction between the red mud slurry and the gypsum may be exothermic. Accordingly, the gypsum may be added to the red mud slurry slowly, such as dropwise, in order to maintain the reaction temperature at around ambient. In particular embodiments, the reaction temperature may be maintained below 47° C. Additionally, in order to maintain ambient conditions, the reaction vessel containing the red mud slurry may be equipped to regulate the temperature and pressure, such as with a chiller or an ice water bath. For example, on a large scale, the reaction vessel may be an industrial-type stainless steel batch reactor equipped with a recirculating ice water bath in order to ensure the desired conditions. In one or more embodiments, the red mud slurry is stirred during and after the addition of the gypsum. The red mud slurry may be stirred for an amount of time ranging from about 3 to about 6 hours. For example, in one or more embodiments, the red mud slurry is stirred for an amount of time ranging from a lower limit of one of 3.0, 3.5, 4.0, and 4.5 hours to an upper limit of one of 4.5, 5.0, 5.5, and 6.0 hours, where any lower limit may be paired with any mathematically compatible upper limit.

In method 100, after the gypsum is added to the red mud slurry and while the red mud slurry is being stirred, one or more calcium-containing mineral complexes are formed 106. The one or more calcium-containing mineral complexes may be formed by the displacement of Na$^+$ ions in the red mud slurry with Ca$^{2+}$ ions from the gypsum. Exemplary calcium-containing mineral complexes that may be formed in one or more embodiments include, but are not limited to, tricalcium aluminate (Ca$_3$Al$_2$(OH)$_2$), hydrocalumite (Ca$_3$Al$_2$(OH)$_{12}$CaCO$_3$·5H$_2$O), ettringite (Ca$_3$Al$_2$(OH)$_{12}$·3CaSO$_4$·26H$_2$O), and combinations thereof. The following reaction formulas (1-3) show the formation of three exemplary calcium-containing mineral complexes via the displacement of $Na^+$ with $Ca^{2+}$.

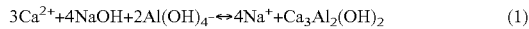

$$3Ca^{2+}+4NaOH+2Al(OH)_4^- \leftrightarrow 4Na^+ + Ca_3Al_2(OH)_2 \quad (1)$$

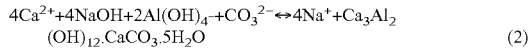

$$4Ca^{2+}+4NaOH+2Al(OH)_4^- +CO_3^{2-} \leftrightarrow 4Na^+ +Ca_3Al_2(OH)_{12}\cdot CaCO_3\cdot 5H_2O \quad (2)$$

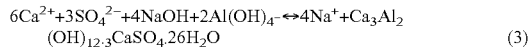

$$6Ca^{2+}+3SO_4^{2-}+4NaOH+2Al(OH)_4^- \leftrightarrow 4Na^+ +Ca_3Al_2(OH)_{12}\cdot 3CaSO_4\cdot 26H_2O \quad (3)$$

In particular embodiments, the one or more calcium-containing mineral complexes include all three of tricalcium aluminate, hydrocalumite, and ettringite.

Finally, in method 100, a neutralized red mud slurry is provided 108. After the red mud is neutralizing and the one or more calcium-containing mineral complexes are formed, the reaction may be agitated at ambient conditions for a sufficient amount of time. In one or more embodiments, the reaction is agitated for an amount of time sufficient to provide a neutralized red mud slurry having a high homogeneity and a suitable pH. The sufficient amount of time may range from 2.0 to 4.0 hours. For example, in order to provide a neutralized red mud slurry with the desired properties, the reaction may be stirred for an amount of time ranging from a lower limit of one of 2.0, 2.5, and 3.0 hours to an upper limit of one of 3.0, 3.5, and 4.0 hours, where any lower limit may be paired with any mathematically compatible upper limit.

As described above, the reaction may be agitated until a neutralized red mud having the desired properties is provided. Thus, during agitation, various properties of the reaction may be monitored. Properties such as temperature, pH, homogeneity, among others, may be monitored. In one or more embodiments, change in such properties may indicate the completeness of the neutralization reaction. For example, a neutralized red mud slurry may exhibit a higher homogeneity, due to incorporation of and reaction with the gypsum. Similarly, the neutralized red mud slurry may have a lower pH, due to neutralization of the alkaline components. In particular embodiments, the pH of the reaction is monitored and used to determine the completeness of the reaction by indicating neutralization of the red mud. The pH may be monitored according to methods known in the art.

In one or more embodiments, the reaction may be completed, and the red mud slurry neutralized, when the reaction has a pH ranging from 7.5 to 9.0. For example, a neutralized red mud slurry may have a pH ranging from a lower limit of one of 7.5, 8.0, and 8.5, to an upper limit of one of 8.0, 8.5, and 9.0, where any lower limit may be paired with any mathematically compatible upper limit. In particular embodiments, the neutralized red mud slurry may have a pH ranging from 8.5 to 9.0.

In one or more embodiments, a neutralized red mud slurry prepared according to method 100 is used in the field without any further purification.

Kill Fluid Composition

In another aspect, embodiments disclosed herein relate to a composition for killing a sour well. The composition may be a red mud-based kill fluid. The kill fluid composition may include a neutralized red mud slurry, a polymeric material, and an $H_2S$ capturing agent. In order to effectively kill a sour well, such composition may have a high density and an ability to absorb sour gas.

In one or more embodiments, the composition includes a neutralized red mud slurry. The neutralized red mud slurry may be prepared according to method 100, above. As such, the neutralized red mud slurry may include an aqueous fluid and one or more calcium-containing mineral complexes as previously described.

The one or more calcium-containing mineral complexes included in the neutralized red mud slurry may have weighting agent properties, i.e., they may impart the slurry with a high density. As such, the red mud-based kill fluid composition may include the neutralized red mud slurry in an amount sufficient to provide the composition with a suitable density. Accordingly, the neutralized red mud slurry may be present in the kill fluid composition in an amount ranging from about 70 to 98 wt %, based on the total weight of the kill fluid composition. For example, in one or more embodiments, the kill fluid composition includes the neutralized red mud slurry in an amount ranging from a lower limit of one of 70, 75, and 80 wt % to an upper limit of 85 wt %, where any lower limit may be paired with any mathematically compatible upper limit.

In one or more embodiments, the red mud-based kill fluid composition includes a polymeric material. The polymeric material may be any polymeric material known in the art useful as a fluid loss control agent, such as, for example, starch, xanthan gum, and carboxymethyl cellulose. In one or more embodiments, the polymeric material is a polysaccharide. The polysaccharide may be included in the killing fluid composition as a powder, such as a microcrystalline powder. The polysaccharide may be cellulose. Without being bound by any theory, the free hydroxyl groups positioned in the ring structure of cellulose, as well as the presence of β-1,4-glycosidic linked D-glucopyranose units in its polymeric framework may provide a red mud-based kill fluid with enhanced viscosity and fluid loss control properties. As will be appreciated by one of ordinary skill in the art, cellulose is primarily derived from cotton fibers and wood. However, cellulose is present in, and may be derived from, various other plant fibers such as corn cobs or stalks, soybean hulls, sugar cane stalks, oat hulls, rice hulls, wheat straw, sugar beet pulp, and bamboo, among others. In one or more embodiments, the polymeric material is cellulose derived from a fiber other than cotton fiber or wood. In particular embodiments, the polymeric material is corn-based cellulose.

The polymeric material may be included in the red mud-based kill fluid in an amount sufficient to impart a suitable viscosity to the killing fluid. In one or more embodiments, the polymeric material may be included in the kill fluid composition in an amount ranging from 1.0 to 20 wt %, based on the total weight of the kill fluid composition. For example, in one or more embodiments, the kill fluid composition includes the polymeric materials in an amount ranging from a lower limit of one of 17, 18, and 19 wt %, to an upper limit of one of 18, 19 and 20 wt %, where any lower limit may be paired with any mathematically compatible upper limit. In another embodiment, the range for the polymeric material is 13.5 to 15 wt %.

In one or more embodiments, the red mud-based kill fluid composition includes an $H_2S$ capturing agent. Any compound known in the art that exhibits $H_2S$ absorption, neutralization, and/or conversion may be used as an $H_2S$ capturing agent in the present composition. Suitable $H_2S$ capturing agents include, but are not limited to, silver nitrate, sodium hydroxide, ferric chloride, ferrous sulfate, zinc acetate, and copper sulfate. In one or more particular embodiments, the $H_2S$ capturing agent is zinc acetate.

The $H_2S$ capturing agent may be included in the red mud-based killing fluid an amount sufficient to provide the kill fluid with suitable $H_2S$ absorption properties. In one or more embodiments, the red mud-based kill fluid includes an $H_2S$ capturing agent in an amount ranging from 1.0 to 9.0 wt % based on the total weight of the kill fluid composition. For example, in one or more embodiments, the $H_2S$ capturing agent is included in the red mud-based kill fluid composition in an amount ranging from a lower limit of one of 1.0, 2.0, 3.0, 4.0, and 5.0 wt % to an upper limit of one of 5.0, 6.0, 7.0, 8.0, and 9.0, wt %, where any lower limit may be paired with any mathematically compatible upper limit.

Kill Fluid Properties

As described above, the red mud-based kill fluid composition may have various properties that enable concurrent killing of a well and treatment of sour gas in the well. For example, the kill fluid composition of one or more embodiments may be formulated to have a specific density, viscosity, $H_2S$ absorption, and $CO_2$ absorption, among others.

In one or more embodiments, the red mud-based kill fluid has a high density. As noted previously, the one or more calcium-containing mineral complexes may act as a weighting agent to impart the kill fluid with such high density. The kill fluid may have a density high enough to produce a hydrostatic pressure at the point of influx in a wellbore that is sufficient to shut off flow into the well. As such, the kill fluid may form a plugging layer within the wellbore.

The red mud-based kill fluid composition may have a density ranging from 11 to 15 pounds per gallon (ppg). For example, in one or more embodiments, the kill fluid has a density ranging from a lower limit of one of 11, 11.5, 12, 12.5, and 13 ppg to an upper limit of one of 13, 13.5, 14, 14.5, and 15 ppg, where any lower limit may be paired with any mathematically compatible upper limit. Similarly, the red mud-based kill fluid composition may have a high specific gravity. The specific gravity of the kill fluid may range from 1.2 to 1.8. For example, in one or more embodiments, the kill fluid has a specific gravity ranging from a lower limit of one of 1.2, 1.3, 1.4 and 1.5 to an upper limit of one of 1.5, 1.6, 1.7, and 1.8, where any lower limit may be paired with any mathematically compatible upper limit.

In one or more embodiments, the red mud-based kill fluid composition has a high viscosity. As previously described, a high viscosity of the kill fluid may be achieved by the presence of the polymeric material. The kill fluid composition may have a high viscosity in order to minimize fluid loss from a well.

In one or more embodiments, the red mud-based kill fluid may have a viscosity ranging from 30 to 70 millipascal-seconds (mPa·s) as measured by a rotational viscometer. For example, in one or more embodiments, the kill fluid composition has a viscosity ranging from a lower limit of one of 30, 35, 40, 45, and 50 mPa·s to an upper limit of one of 50, 55, 60, 65, and 70 mPa·s, where any lower limit may be paired with any mathematically compatible upper limit. In one or more embodiments, the viscosity of the red mud-based kill fluid increases with increasing temperature. For example, whereas the kill fluid may have a viscosity of about 30 millipascal-seconds (mPa·s) at 70° C., the viscosity may increase to about 60 mPa·s at 125° C. Thus, the red mud-based kill fluid may exhibit high viscosity at reservoir conditions such as high temperature and high pressure.

In one or more embodiments, the red mud-based kill fluid composition has a sufficiently neutral pH. A pH that is sufficiently neutral may not have basic or acidic properties, and thus may be fairly inert. Suitable pH's that may be considered sufficiently neutral in accordance with the present disclosure may range from 7.5 to 9.5. Thus, in one or more embodiments, the kill fluid composition has a pH ranging from a lower limit of one of 7.5, 8.0, and 8.5 to an upper limit of one of 8.5, 9.0, and 9.5, where any lower limit may be paired with any mathematically compatible upper limit. In particular embodiments, the red mud-based kill fluid may have a pH ranging from 8.0 to 8.5.

In one or more embodiments, upon exposure to high temperature, the red mud-based kill fluid shows enhanced stability and crystallinity. The stability of the red mud-based kill fluid may be determined by the mineralogical composition and the gelation properties of the fluid. For example, at 70° C., the fluid composition may solidify and at 125° C., the composition may crystallize. The crystallized composition may be characterized by scanning electron microscopy (SEM) images and energy-dispersive x-ray spectroscopy (EDS) analysis. EDS analysis may provide an elemental composition of the crystallized composition. In one or more embodiments, the elemental composition of the crystallized killing fluid primarily includes C. Ca, Na, Al, Fe, and Zn. Minor elements that may be present in the crystallized composition include, but are not limited to, Si, Ti, O, and Cl.

As previously described, the kill fluid compositions disclosed herein may be capable of treating sour gas. In one or more embodiments, compositions may kill a well while concurrently treating sour gas produced by the well. Alternatively, composition may first kill a well, and subsequently treat any sour gas within the well. Whether treatment and killing of the well occur in a simultaneous or stepwise manner, the red mud-based kill fluid may continue to treat sour gas for a sufficient amount of time after successfully killing the well.

Accordingly, the kill fluid composition may be capable of absorbing sour gas including $H_2S$ and $CO_2$. In one or more embodiments, the red mud-based kill fluid has a high absorption efficiency of $H_2S$ and $CO_2$. The red mud-based kill fluid may have an absorption efficiency that enable a progressive decline in the concentration of $H_2S$ and $CO_2$ over time. For example, a sour well may have an initial concentration of $H_2S$ and $CO_2$ gas ranging from about 6 to about 10 wt %. After exposure to a red mud-based kill fluid of one or more embodiments, the well may have a concentration of $H_2S$ and $CO_2$ gas of less than 1 wt %. Thus, in one or more embodiments, the kill fluid composition may reduce the concentration of $H_2S$ and $CO_2$ gas in a sour well by about 80 to 100%. For example, the kill fluid composition may be capable of reducing the concentration of $H_2S$ and $CO_2$ gas in a sour well by an amount ranging from a lower limit of one of 80, 82, 84, 86, 88, and 90%, to an upper limit of one of 90, 92, 94, 96, 98, and 100%, where any lower limit may be paired with any mathematically compatible upper limit.

In one or more embodiments, the absorption efficiency is increased at high temperature. An increase in temperature may increase the nucleation, aggregation, and sorption properties of the dominant minerals to form ionic and covalent bonds with $CO_2$ and $H_2S$ via precipitation processes. Further increase in temperature may lead to the solidification and subsequent incorporation of the precipitated salts to the crystallized red-mud fluid.

Without being bound by any theory, the red mud-based kill fluid composition may have a high absorption efficiency because of its capacity to react simultaneously with acidic gases via liquid to gel phase carbonation and sulfidation reactions. Accordingly, in one or more embodiments, the sulfidation and carbonation reactions cause the red mud-based kill fluid to change from a liquid phase to a gel phase, and from a gel phase to a solid phase. Such processes may be dependent on the mineralogical composition, the rate of gelation (viscosity), and temperature of the reservoir. In one or more embodiments, $CO_2$ gas may react with the red mud-based kill fluid composition according to one or more of the following carbonation reactions (4-6):

  (4)

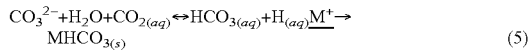  (5)

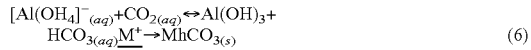  (6)

where M is $Ca^{2+}$, $Fe^{2+}$, $Na^+$, or a combination thereof. As shown in carbonation reactions 4-6, noxious $CO_2$ may be converted to various metal carbonates and bicarbonates in the presence of hydroxide ions, monovalent metals, divalent metals, trivalent metals, and aluminate. Such ions and ionic complexes may be present in red mud-based kill fluid compositions in accordance with the present disclosure.

In one or more embodiments, $H_2S$ gas may react with the red mud-based kill fluid composition according to one or more of the following sulfidation reactions (7-9):

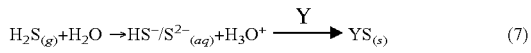  (7)

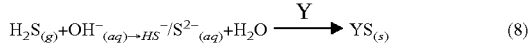  (8)

  (9)

where Y is $Zn^{2+}$, $Fe^{2+}$, $Na^+$, or a combination thereof and YO is ZnO, FeO, or a combination thereof. As shown in sulfidation reactions 7-9, noxious $H_2S$ may be converted to various metal sulfides in the presence of hydroxide ions, monovalent metals, and divalent metals. Such ions and metals may be present in red mud-based kill fluid compositions in accordance with the present disclosure.

Red mud-based kill fluid compositions that exhibit one or more of the above properties may be used in well kill operations. Thus, kill fluid compositions of one or more embodiments may provide efficient and effective sour gas treatment, while plugging and killing a well.

Method of Preparing a Kill Fluid Composition

One or more embodiments of the present disclosure relate to a method of preparing a red mud-based kill fluid composition as previously described. The method may include providing a solution including a polymeric material and an $H_2S$ capturing agent and subsequently introducing the solution to a neutralized red mud slurry.

Figure 2:
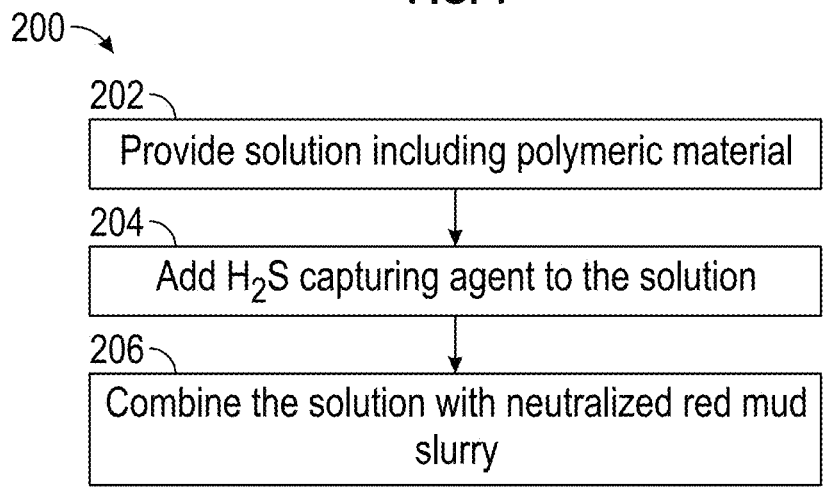
FIG. 2 is a block flow diagram of a method of preparing a red mud-based kill fluid in accordance with one or more embodiments of the present disclosure.

A method of preparing a red mud-based kill fluid composition is shown in, and discussed with reference, to FIG. 2. As shown in FIG. 2, method 200 initially includes providing a solution including a polymeric material and an aqueous fluid 202. The polymeric material is as previously described.

In one or more embodiments, the solution includes a polymeric material in an amount ranging from 10 to 40 wt %, based on the total weight of the solution. For example, the polymeric material may be present in the solution in an amount ranging from a lower limit of one of 10, 15, 20, and 25 wt % to an upper limit of any of 30, 32, 35, 37, and 40 wt %, where any lower limit may be paired with any mathematically compatible upper limit.

As described above, the solution may include an aqueous fluid. The aqueous fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment.

In one or more embodiments, the solution includes an aqueous fluid in an amount ranging from 60 to 90 wt %, based on the total weight of the solution. For example, the aqueous fluid may be present in the solution in an amount ranging from a lower limit of one of 60, 62, 65, 67, and 70 wt % to an upper limit of one of 75, 80, 85, and 90 wt %, where any lower limit may be paired with any mathematically compatible upper limit.

The solution may be stirred for a sufficient amount of time in order to achieve suitable homogeneity. The solution may be stirred according to methods known in the art, such as, for example, with an electrical mixer. A sufficient amount of time may range from about 30 minutes to about 3 hours. For example, in one or more embodiments, the solution is stirred for an amount of time ranging from a lower limit of one of 0.5, 0.7, 1.0, and 1.5 hours, to an upper limit of one of 2.0, 2.5, 2.7, and 3.0 hours, where any lower limit may be paired with any mathematically compatible upper limit.

Then, method 200 includes adding an $H_2S$ capturing agent to the solution including the polymeric material 204. The $H_2S$ capturing agent is as previously described. In one or more embodiments, the $H_2S$ capturing agent is added to the solution such that the solution includes the $H_2S$ capturing agent in an amount ranging from 5.0 to 20 wt %, based on the total weight of the solution. For example, the $H_2S$ capturing agent may be present in the solution in an amount ranging from a lower limit of one of 5.0, 6.0, 7.0, 8.0, 9.0, and 10 wt % to an upper limit of one of 10, 12, 15, 17, and 20 wt %, where any lower limit may be paired with any mathematically compatible upper limit.

In one or more embodiments, the solution including the polymeric agent and the $H_2S$ capturing agent is stirred for an amount of time. The solution may be stirred such that the polymeric agent and the $H_2S$ capturing agent are mixed uniformly throughout the solution. In one or more embodiments, the solution is stirred for an amount of time ranging from about 1.0 to about 6.0 hours. For example, a solution including a polymeric material and an $H_2S$ capturing agent may be stirred for an amount of time ranging from a lower limit of one of 1.0, 1.5, 2.0, 2.5, and 3.0 hours to an upper limit of one of 4.0, 4.5, 5.0, 5.5, and 6.0 hours, where any lower limit may be paired with any mathematically compatible upper limit.

Finally, method 200 includes combining the solution with a neutralized red mud slurry 206 to provide a red mud-based kill fluid in accordance with the present disclosure. In one or more embodiments, the neutralized red mud slurry is prepared using gypsum according to the neuralization method (method 100) previously described. Such embodiments may be preferred as the neutralization method does not require the use of caustic chemicals such as strong acids.

In order to provide a red mud-based kill fluid with suitable properties such as, for example, viscosity and density, the killing fluid may be stirred for an amount of time. In one or more embodiments, the kill fluid is stirred constantly using a mechanical stirrer. A red mud-based kill fluid having the desired properties may be achieved after stirring for an amount of time ranging from 8 to 24 hours. For example, in one or more embodiments, the kill fluid composition is stirred for an amount of time ranging from a lower limit of one of 8, 10, 12, 14, and 16 hours to an upper limit of one of 16, 18, 20, 22, and 24 hours, where any lower limit may be paired with any mathematically compatible upper limit.

Method of Killing and Treating a Sour Well

In yet another aspect, embodiments of the present disclosure relate to a method of using the red mud-based kill fluid composition described above. The method may include using a pump and pull placement technique to plug a bottom hole section of a well.

Figure 3:
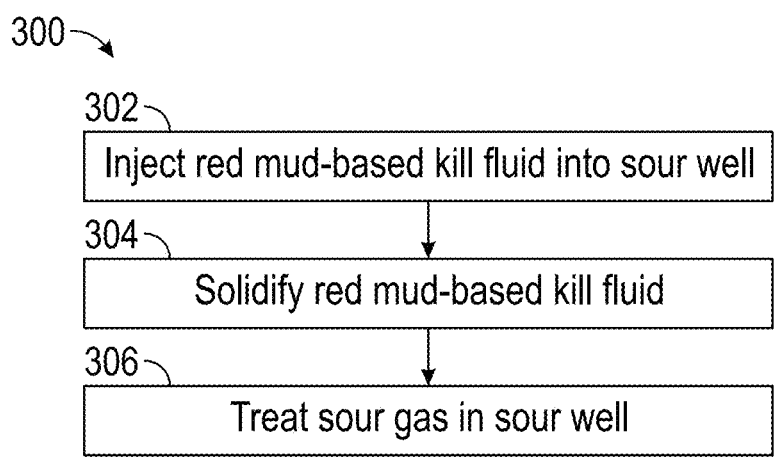
FIG. 3 is a block flow diagram of a method of treating a sour well in accordance with one or more embodiments of the present disclosure.

The pump and pull technique is an alternative method to improve the killing fluid placement in deviated and horizontal wellbores, as compared to the conventional pump and plug method. A method, 300, of using the red mud-based kill fluid in well kill operations according to the pump and pull technique including the treatment of sour gas is shown in FIG. 3. In method 300, a red mud-based kill fluid of one or more embodiments is injected into a well 302. In one or more embodiments, the well is a sour well. The kill fluid may be injected into the well to such that the well is no longer capable of producing hydrocarbons or other downhole liquids and gases. The kill fluid may be pumped into the well by running a working string from the bottom of the well to the top for proper slurry circulation and displacement.

In one or more embodiments, the red mud-based kill fluid may be pumped into the well in order to ensure sufficient placement of the red mud-based kill fluid in the bottom hole section of the well. The kill fluid may be pumped for an amount of time ranging form about 10 to about 30 minutes, depending on the diameter and depth of the wellbore. In general, the red mud-based kill fluid may be pumped for about 15 minutes. After kill fluid placement, the string may be carefully removed from the mud to avoid plug disturbances. In one or more embodiments, the pump and pull technique is repeated up to 3 times with the same volume of kill fluid until the entire section of well is plugged to the to prevent acid gas emissions.

After injecting the red mud-based kill fluid into the well, method 300 includes solidifying the red mud-based kill fluid within the well 304. As described above, at reservoir conditions such as high temperature and pressure, the kill fluid may solidify to become a plug at reservoir conditions. Thus, once the red mud-based kill fluid has been injected into the well and exposed to downhole temperatures, the kill fluid may exist as a solid to crystallized phase to plug the well. As such, the kill fluid may effectively inhibit the production of the well.

Finally, in method 300, sour gas that is present inside the well may be treated upon exposure to the red mud-based kill fluid 306. In one or more embodiments, $H_2S$ and $CO_2$ gas react with the kill fluid via the sulfidation and carbonation reactions described above (formulas 4-9) to yield nontoxic metal sulfides, carbonates, and bicarbonates. As described above, the kill fluid may reduce the amount of sour gas in the well by about 80 to 100%.

EXAMPLES

Reagent grade chemicals used in the following examples include zinc acetate ($ZnOA_C$) obtained from Sigma-Aldrich. Locally sourced gypsum ($CaSO_4 \cdot 2H_2O$) mineral and corn-based microcrystalline cellulose powder were used to reduce the costs of the red mud-based kill fluid formulation. Waste red mud (RM) from Ma'aden Saudi Arabian Aluminum Company was collected at the dump site after alumina recovery from the digestion process. The waste red mud measured a pH of 12.8 and contained about 39% of free water and 61% of one or more minerals. A sub-sample acid digestion in 10 mL perchloric acid, 10 mL nitric and 2 mL hydrofluoric acid upon heating revealed the following the elemental abundance by inductively coupled plasma mass spectrometry (ICP-MS): Fe, Al, Na, Si, Ca, Ti, Zn, Sr, Cr, K, Mg, Mn, Ce, Pb, Ni, Th, S and P. The mineralogical composition of the waste red mud characterized by powder X-ray diffraction (XRD) showed the following minerals: Larnite ($Ca_2(SiO_4)$), Cancrinite (($NaCa)_8(AlSiO_4)_6(CO_3SO_4)_2 \cdot 2H_2O$), Hematite ($Fe_2O_3$), Goethite (FeO(OH)), Calcite ($CaCO_3$), Perovskite ($CaTiO_3$), Grossite ($CaAl_4O_7$), Quartz ($SiO_2$), and Gibbsite ($Al(OH)_3$).

Red Mud Neutralization

The red mud slurry (3.0 liters) was poured into a 10-liter industrial-type borosilicate glass reactor equipped with mechanical stirrer, thermostat, pH meter, and recirculating chiller to maintain the reaction at room temperature (about 25° C.). A 15 wt. % gypsum solution was added to the red mud slurry with constant stirring. The red mud slurry was agitated with an electrical mixer for 3 hours until a homogeneous solution with pH of 8.7 was obtained.

The presence of salts and other ions in the red mud increased the solubility of gypsum during the neutralization process. Additionally, the reaction of $Ca^{2+}$ in gypsum displaced the $Na^+$ in the caustic complexes to lower the pH of the red mud slurry to 8.7 according to the key reactions shown in formulas 1-3 to form an aqueous slurry-like phase mineral, comprising: tricalcium aluminate ($Ca_3Al_2(OH)_2$), hydrocalumite ($Ca_3Al_2(OH)_{12}CaCO_3 \cdot 5H_2O$), and ettringite ($Ca_3Al_2(OH)_{12} \cdot 3CaSO_4 \cdot 26H_2O$).

Preparation of Red Mud-based Kill Fluid

Approximately 515 grams of corn-based microcrystalline cellulose powder was dissolved in 1.0 L of deionized water. The solution was mixed using an electrical mixer for 1 hour followed by the addition of 181.5 grams of zinc acetate. After about 2 hours of mixing, the mixture was slowly added to the neutralized red mud slurry in the borosilicate glass reactor. The mixture was then stirred constantly with a mechanical stirrer overnight to yield a reddish, gelatinous, viscous red mud-based fluid that is pumpable as a high-density kill fluid to control the release of acid gas contaminants into the environment.

Evaluation of Red Mud-based Kill Fluid Properties

Various properties of the inventive red mud-based kill fluid were determined in laboratory studies using a Baroid mud balance, a Mettler Toledo benchtop PH meter, and a Fann viscometer. The properties including the mud density, specific gravity, pH, and the estimated fluid viscosity range are shown in Table 1, below. The fluid viscosity range was estimated from the viscosity curves shown in FIG. 4.

TABLE 1

General Properties of exemplary red mud-based kill fluid compositions

| Mud Properties | Density (ppg) | Specific Gravity (g/cm$^3$) | pH | Viscosity (mPa · s) |
|---|---|---|---|---|
| Range (Duplicate) | 12.4-12.7 | 1.49-1.52 | 7.9-8.3 | 59.8-60.3 |
| Average | 12.55 | 1.51 | 8.2 | 60.1 |

Figure 4:
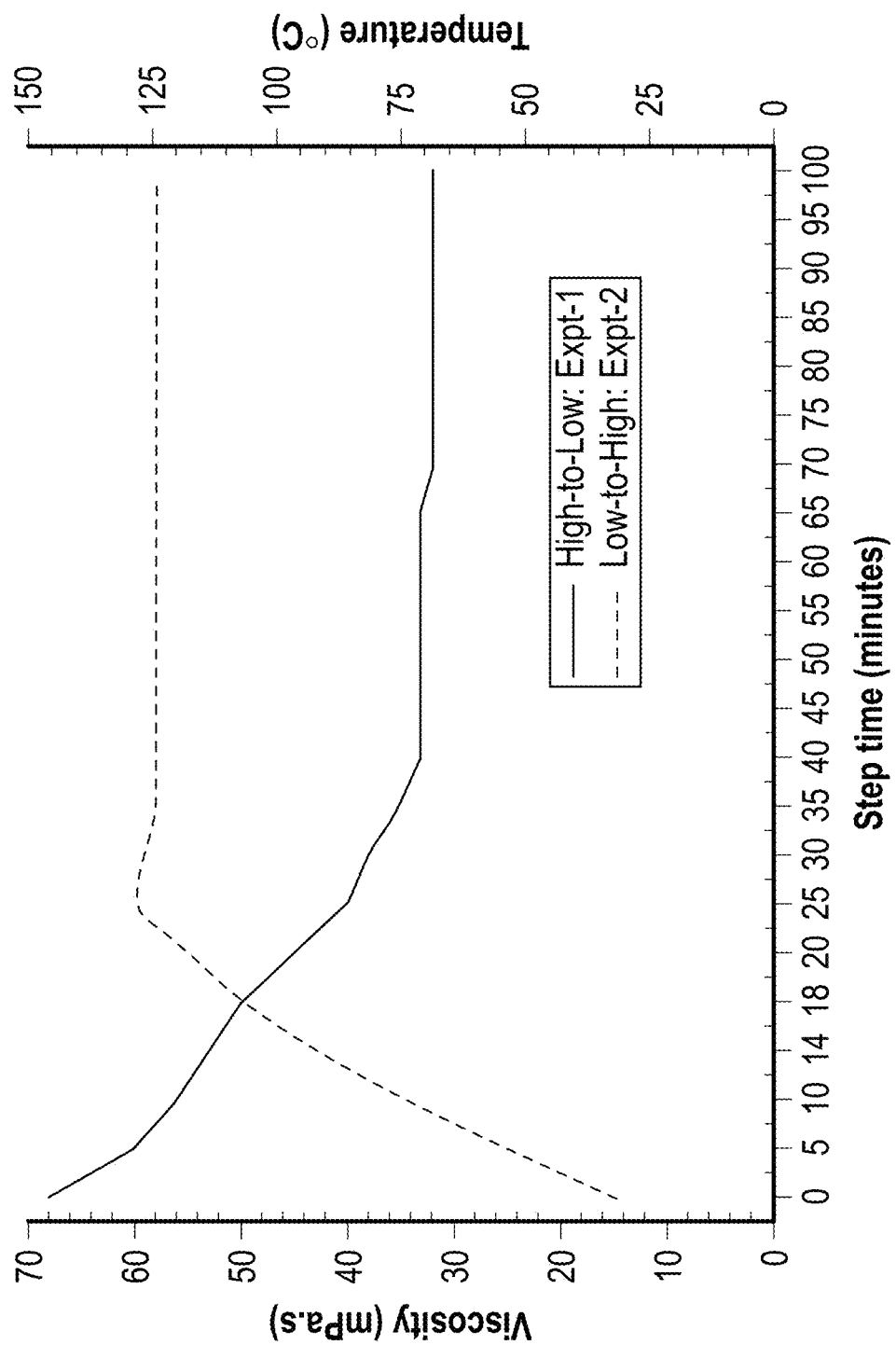
FIG. 4 is a graph of the viscosity of a red mud-based kill fluid in accordance with one or more embodiments of the present disclosure.

Overall properties of the inventive red mud-based kill fluid formulations showed that the pH, mud density, and observed specific gravity of 1.51 exceed, to some extent, the standard specification of reservoir kill fluids with a density of 1.40. Although the viscosity of the kill fluid decreased with time, however, upon heating the products showed a rapid increase in viscosity to reach an optimum temperature of 125° ° C.(as shown in FIG. 4). This observation suggested good rheological characteristics of the disclosed kill fluid at reservoir conditions. Thus, the red mud-based kill fluid formulation can easily be assimilated in many oil and gas field drilling, well workover, and completion operations.

Figure 5A:
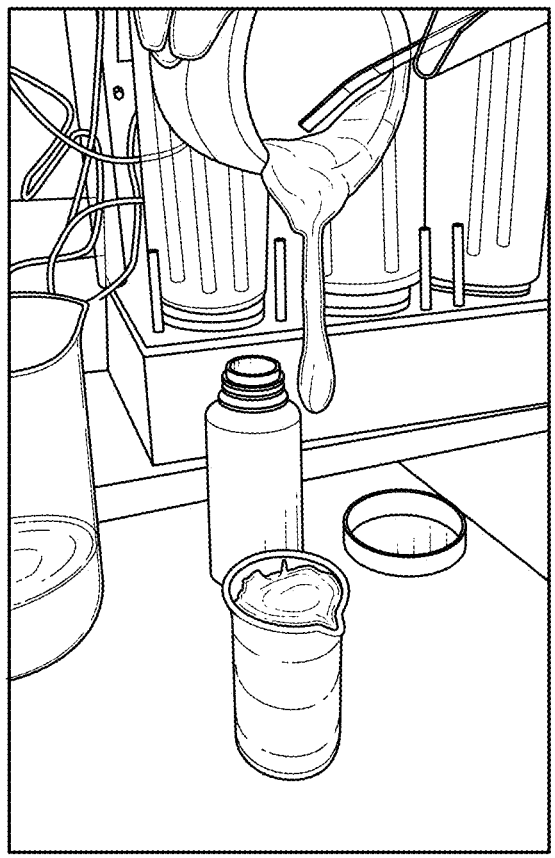
FIGS. 5A-C are photographs of a red mud-based kill fluid in accordance with one or more embodiments of the present disclosure.
Figure 5B:
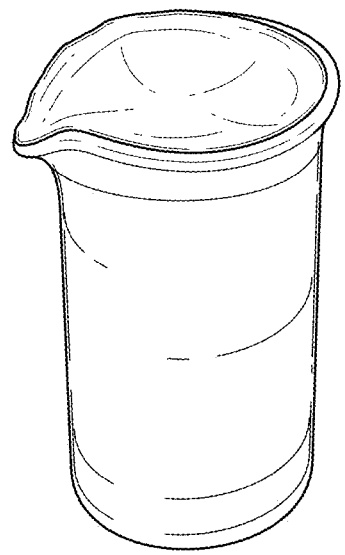
Figure 5C:
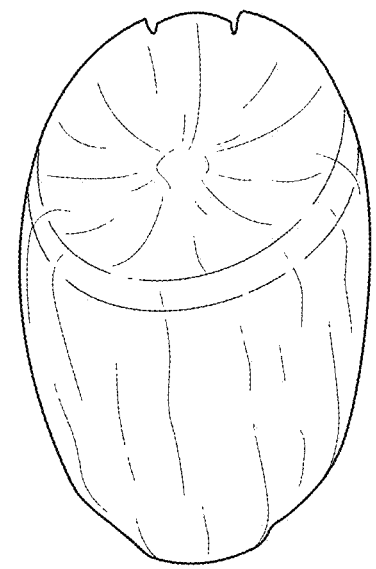
Figure 6A:
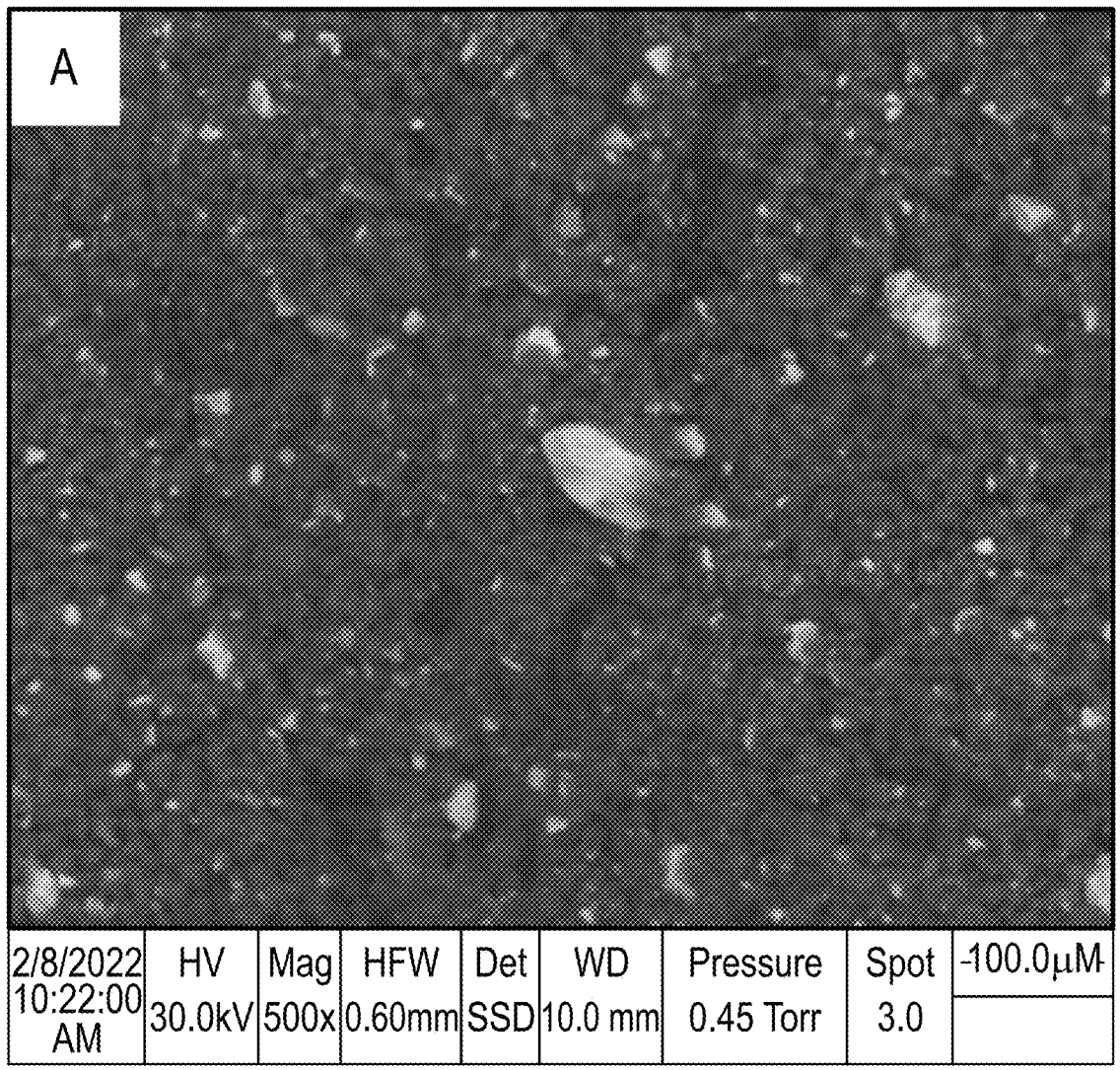
FIGS. 6A-B are ESEM images of a red mud-based kill fluid in accordance with one or more embodiments of the present disclosure.
Figure 6B:
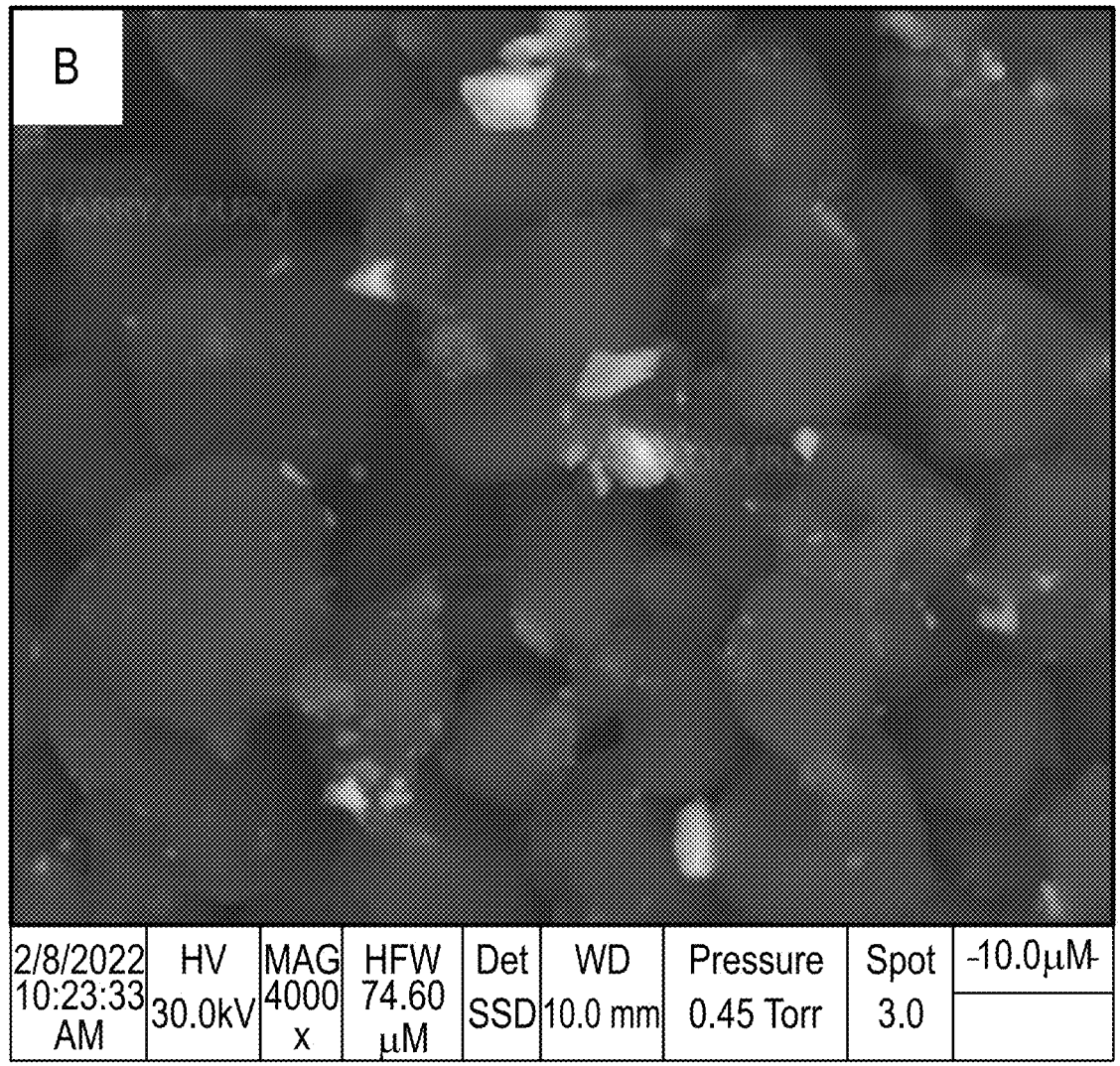
Figure 7:
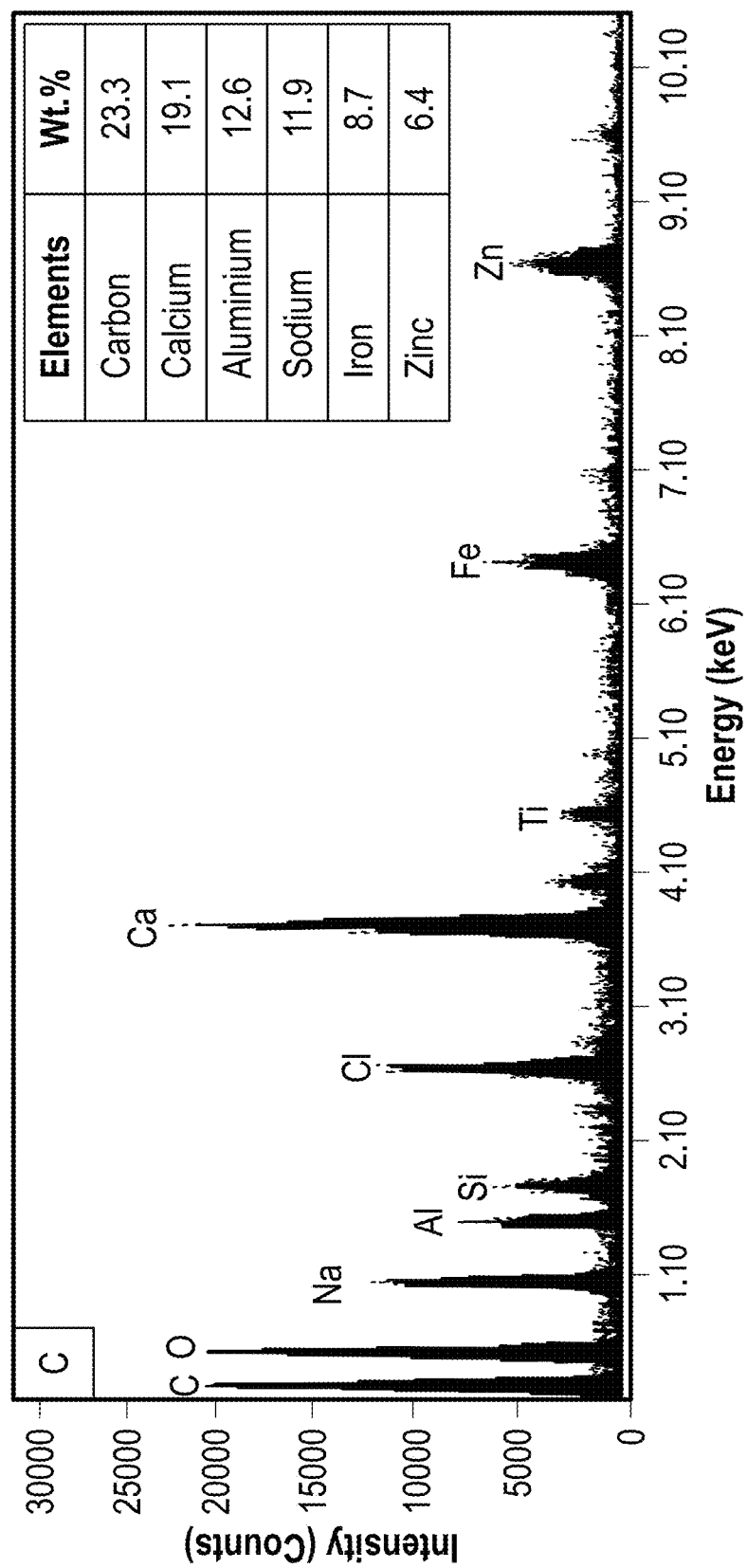
FIG. 7 is an image of an EDS analysis of a red mud-based kill fluid in accordance with one or more embodiments of the present disclosure.

Upon physical examination, the exemplary red mud-based kill fluid presented a unique microstructural and gel-formed features that had enhanced stability, solidification, and crystallization processes upon heating under high temperature reservoir conditions. FIGS. 5A-B show the change in the degree of crystallinity of the red mud-based kill fluid over increased temperatures. In particular, FIG. 5A shows an exemplary red mud-based kill fluid including a corn-based cellulose polymeric agent at ambient temperature. FIG. 5B shows the red mud-based kill fluid after being heated to 70° C., at which point the fluid has somewhat solidified, and FIG. 5C shows the red mud-based kill fluid upon heating up to 125° C., at which point microstructural changes become visible. Further morphological characterization of the kill fluid after heating to 125° C. by environmental scanning electron microscopy (ESEM) images (FIGS. 6A and 6B) with corresponding energy-dispersive x-ray spectroscopy (EDS) analyses in general area analysis mode confirmed the presence C, Ca, Al, Na, Fe, and Zn as the dominant elements in the crystallized materials (FIG. 7). Although Si, Ti, O, and Cl were also found as minor elements in inventive red mud-based kill fluids.

The predominance of these major elements can be attributed to the preservation characteristics, stability, and enhancement of the red mud, which presents unique mineralogical and density features that can be easily fabricated as sustainable kill or drilling fluid additives.

Gas Absorption Tests

Briefly, the absorption tests were performed by slowly pumping 3.5 kg of an exemplary red mud-based kill fluid through a peristaltic pump into core-flooded stainless steel units containing sulfur-bearing petroleum source rock charged with 5.9 wt. % $H_2S$ and $CO_2$ and 7.1 wt. % $CO_2$. Once the unit was completely filled with the red mud-based kill fluid, the temperature and pressure were ramped from 0-150° C. and 0-1000 psi, respectively. Reservoir fluid $CO_2$ and $H_2S$ levels were recorded in real-time using in-situ filter array spectrometer to monitor the $CO_2$ absorption peak and in-situ electrochemical analyzer to measure the absorption of $H_2S$ by the red mud-based kill fluid at reservoir conditions.

Figure 8:
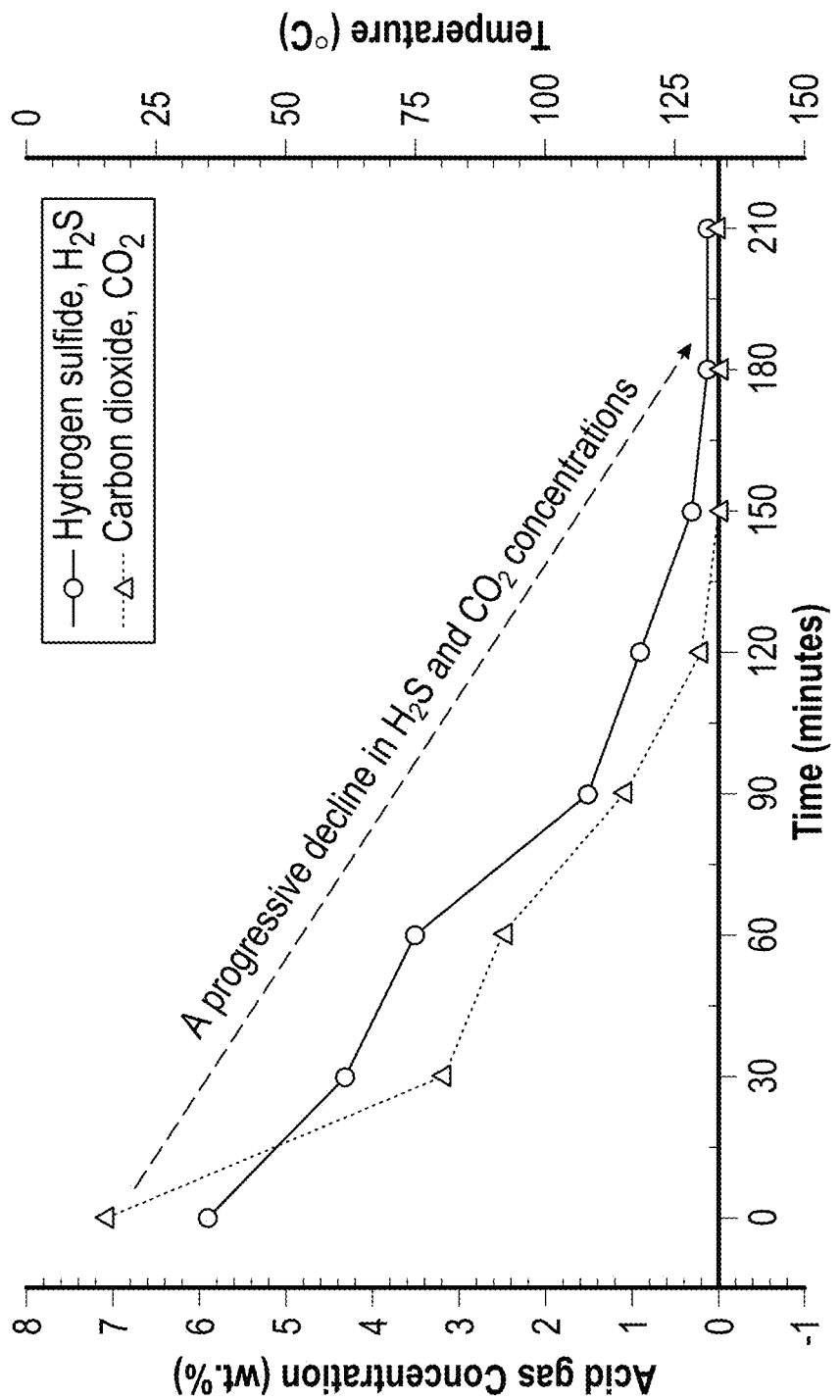
FIG. 8 is a graph of the $H_2S$ and $CO_2$ absorption of a red mud-based kill fluid in accordance with one or more embodiments of the present disclosure.

FIG. 8 shows the absorption efficiency results of the exemplary red mud-based kill fluid that has capacity to react simultaneously with acid gases via liquid to gel-phase carbonation and sulfidation reactions. Based on the steady decline in acid gas concentrations (as shown in FIG. 8) at different temperature and pressure conditions, it is assumed that the carbonation and sulfidation reactions shown in formulas 4-9 proceed in the presence of hydroxide ions, mono-, di-, trivalent metals, and residual aluminum in a form of aluminate ($[Al(OH)4]—$).

Embodiments of the present disclosure may provide at least one of the following advantages. Red mud-based kill fluid composition in accordance with the present disclosure include inexpensive, nontoxic components and may be used in well kill operations of sour wells. Such kill fluid compositions may reduce the concentration of $H_2S$ and $CO_2$ gas in sour wells by at least 80%, while effectively plugging and killing the well. Accordingly, red mud-based kill fluid may provide the hydrocarbon energy industries a practical, cost-effective solution to explore untapped sulfur-bearing reservoirs, while also mitigating environmentally issues related to acid gas emissions during drilling and workover operations.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A red mud-based kill fluid composition comprising:
a neutralized red mud slurry;
a polymeric material; and
an $H_2S$ capturing agent,
wherein the red mud-based kill fluid has a density ranging from 11 to 15 pounds per gallon (ppg);
wherein the neutralized red mud slurry comprises a combination of tricalcium aluminate ($Ca_3Al_2(OH)_2$), hydrocalumite ($Ca_3Al_2(OH)_{12}CaCO_3 \cdot 5H_2O$), and ettringite ($Ca_3Al_2(OH)_{12} \cdot 3CaSO_4 \cdot 26H_2O$).

2. The composition of claim 1, wherein the neutralized red mud slurry comprises water.

3. The composition of claim 1, wherein the polymeric material is a microcrystalline powder.

4. The composition of claim 1, wherein the polymeric material is corn-based cellulose.

5. The composition of claim 1, wherein the $H_2S$ capturing agent is zinc acetate (ZnOAc).

6. The composition of claim 1, wherein the composition has a specific gravity ranging from 1.2 to 1.8.

7. The composition of claim 1, wherein the composition has a pH ranging from 7.5 to 9.0.

8. The composition of claim 1, wherein the composition has a viscosity ranging from 30 to 70 mPa·s.

9. The composition of claim 8, wherein the viscosity increases with an increase in temperature.

10. A method of treating a sour well comprising;
injecting a red mud-based kill fluid comprising a neutralized red mud slurry, a polymeric material, and an $H_2S$ capturing agent into the sour well, wherein the sour well comprises $H_2S$ gas and $CO_2$ gas,
wherein the red mud-based kill fluid has a density ranging from 11 to 15 pounds per gallon (ppg), and
wherein the neutralized red mud slurry comprises a combination of tricalcium aluminate ($Ca_3Al_2(OH)_2$), hydrocalumite ($Ca_3Al_2(OH)_{12}CaCO_3 \cdot 5H_2O$), and ettringite ($Ca_3Al_2(OH)_{12} \cdot 3CaSO_4 \cdot 26H_2O$);
solidifying the red mud-based kill fluid; and
treating the $H_2S$ gas and the $CO_2$ gas in the sour well.

11. The method of claim 10, wherein treating the $H_2S$ gas and the $CO_2$ gas comprises converting the $H_2S$ gas and the $CO_2$ gas into one or more of metal sulfides, metal carbonates, and metal bicarbonates.

* * * * *